(12) United States Patent
Tsuchiya

(10) Patent No.: US 7,778,975 B2
(45) Date of Patent: Aug. 17, 2010

(54) MIRRORING METHOD, MIRRORING DEVICE, AND COMPUTER PRODUCT

(75) Inventor: Naoshi Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 11/902,939

(22) Filed: Sep. 26, 2007

(65) Prior Publication Data

US 2008/0162605 A1 Jul. 3, 2008

(30) Foreign Application Priority Data

Dec. 27, 2006 (JP) ............................. 2006-353267

(51) Int. Cl.
*G06F 7/00* (2006.01)

(52) U.S. Cl. ...................... 707/655; 707/610; 707/659; 707/660; 709/206; 709/224; 709/229; 711/161; 711/162

(58) Field of Classification Search ................. 707/200, 707/204–205, 610, 655, 659, 660; 709/206, 709/224, 229; 711/161, 162
See application file for complete search history.

(56) References Cited

U.S. PATENT DOCUMENTS

| | | | | | |
|---|---|---|---|---|---|
| 5,566,319 | A | * | 10/1996 | Lenz | 711/147 |
| 5,799,141 | A | * | 8/1998 | Galipeau et al. | 714/13 |
| 6,366,988 | B1 | * | 4/2002 | Skiba et al. | 711/165 |
| 6,519,687 | B2 | * | 2/2003 | Akagi | 711/162 |
| 6,662,282 | B2 | * | 12/2003 | Cochran | 711/162 |
| 6,671,705 | B1 | * | 12/2003 | Duprey et al. | 707/204 |
| 6,816,891 | B1 | * | 11/2004 | Vahalia et al. | 709/214 |
| 6,816,951 | B2 | * | 11/2004 | Kimura et al. | 711/162 |
| 6,823,349 | B1 | * | 11/2004 | Taylor et al. | 707/204 |
| 6,871,245 | B2 | * | 3/2005 | Bradley | 710/65 |
| 6,889,309 | B1 | * | 5/2005 | Oliveira et al. | 711/203 |
| 7,047,377 | B2 | * | 5/2006 | Elder et al. | 711/162 |
| 7,181,582 | B2 | * | 2/2007 | Cochran | 711/162 |
| 7,366,742 | B1 | * | 4/2008 | Umbehocker et al. | 707/204 |

(Continued)

FOREIGN PATENT DOCUMENTS

JP 11-55645 2/1999

(Continued)

OTHER PUBLICATIONS

Dor et al.—"Managed care discounting: Evidence from the MarketScan Database"—Inquiry: vol. 41, No. 2 (pp. 159-169).*

(Continued)

*Primary Examiner*—Jean B. Fleurantin
*Assistant Examiner*—Anh Ly
(74) *Attorney, Agent, or Firm*—Staas & Halsey LLP

(57) ABSTRACT

A data storage device stores therein files as mirror source or mirror destination, and has ownership rights to files stored as mirror source. Having received a number of read/write requests to a file stored as mirror destination from a data processing device, the data storage device obtains an ownership right to the file, and updates ownership status of the file from mirror destination to mirror source. Thus, response time to the read/write requests to the file can be improved. After that, if the data processing device frequently requests another data storage device for access to the file, an ownership right to the file is transferred to the other data storage device, and accordingly, the ownership status of the file is updated.

12 Claims, 16 Drawing Sheets

U.S. PATENT DOCUMENTS

| | | |
|---|---|---|
| 7,437,601 B1 * | 10/2008 | Manley et al. .................. 714/6 |
| 7,610,286 B1 * | 10/2009 | Yu et al. ........................ 707/9 |
| 2001/0052059 A1 * | 12/2001 | Akagi ........................ 711/162 |
| 2002/0056031 A1 * | 5/2002 | Skiba et al. .................. 711/162 |
| 2002/0065810 A1 * | 5/2002 | Bradley ........................ 707/2 |
| 2002/0152362 A1 * | 10/2002 | Cochran ...................... 711/162 |
| 2003/0182330 A1 * | 9/2003 | Manley et al. ............... 707/205 |
| 2003/0195903 A1 * | 10/2003 | Manley et al. ............... 707/201 |
| 2004/0024894 A1 * | 2/2004 | Osman et al. ............... 709/230 |
| 2004/0039889 A1 * | 2/2004 | Elder et al. .................. 711/162 |
| 2004/0148376 A1 * | 7/2004 | Rangan et al. .............. 709/223 |
| 2005/0010615 A1 * | 1/2005 | Cypher et al. ................ 707/201 |
| 2005/0027892 A1 * | 2/2005 | McCabe et al. ............. 709/253 |
| 2005/0091448 A1 * | 4/2005 | Nakatani et al. ............ 711/113 |
| 2006/0036648 A1 * | 2/2006 | Frey et al. ................... 707/200 |
| 2006/0184587 A1 * | 8/2006 | Federwisch et al. ......... 707/200 |
| 2006/0282637 A1 | 12/2006 | Yamauchi et al. |
| 2007/0192375 A1 * | 8/2007 | Nakatani et al. ............ 707/200 |
| 2009/0070337 A1 * | 3/2009 | Romem et al. ................ 707/10 |
| 2009/0106298 A1 * | 4/2009 | Furusho ...................... 707/102 |

FOREIGN PATENT DOCUMENTS

| | | |
|---|---|---|
| JP | 2001-331360 | 11/2001 |
| JP | 2003-167683 | 6/2003 |
| JP | 2005-128861 | 5/2005 |
| JP | 2005-157710 | 6/2005 |
| JP | 2005-306407 | 11/2005 |
| JP | 2005-535226 | 11/2005 |
| JP | 2006-343924 | 12/2006 |

OTHER PUBLICATIONS

Devarakonda et al.—"Recovery in the Calypso file system"—ACM Transactions on Computer Systems (TOCS) ACM 1996 vol. 14, issue 3 (pp. 287-310).*

Japanese Office Action issued on Jan. 30, 2009 in corresponding Japanese Patent Application 2006-353267.

Korean Office Action for corresponding Korean application 10-2007-137975; mailed Aug. 20, 2009.

* cited by examiner

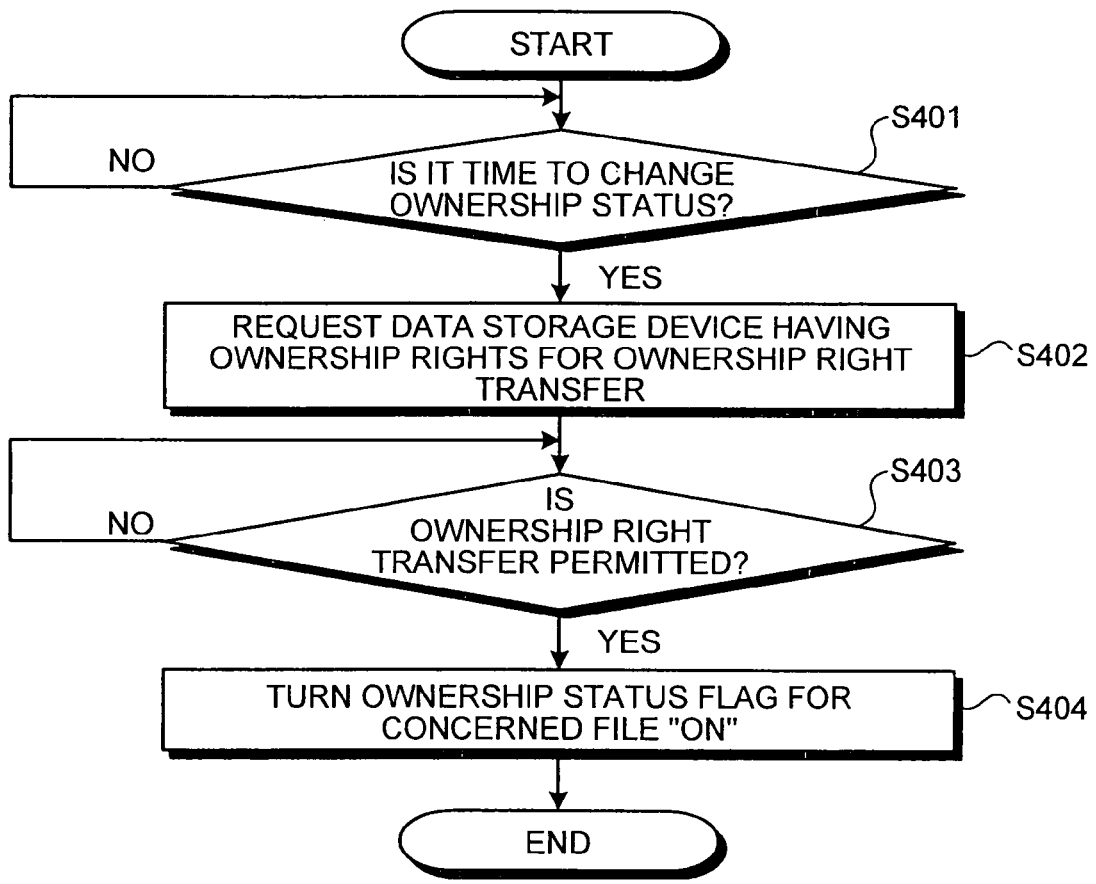

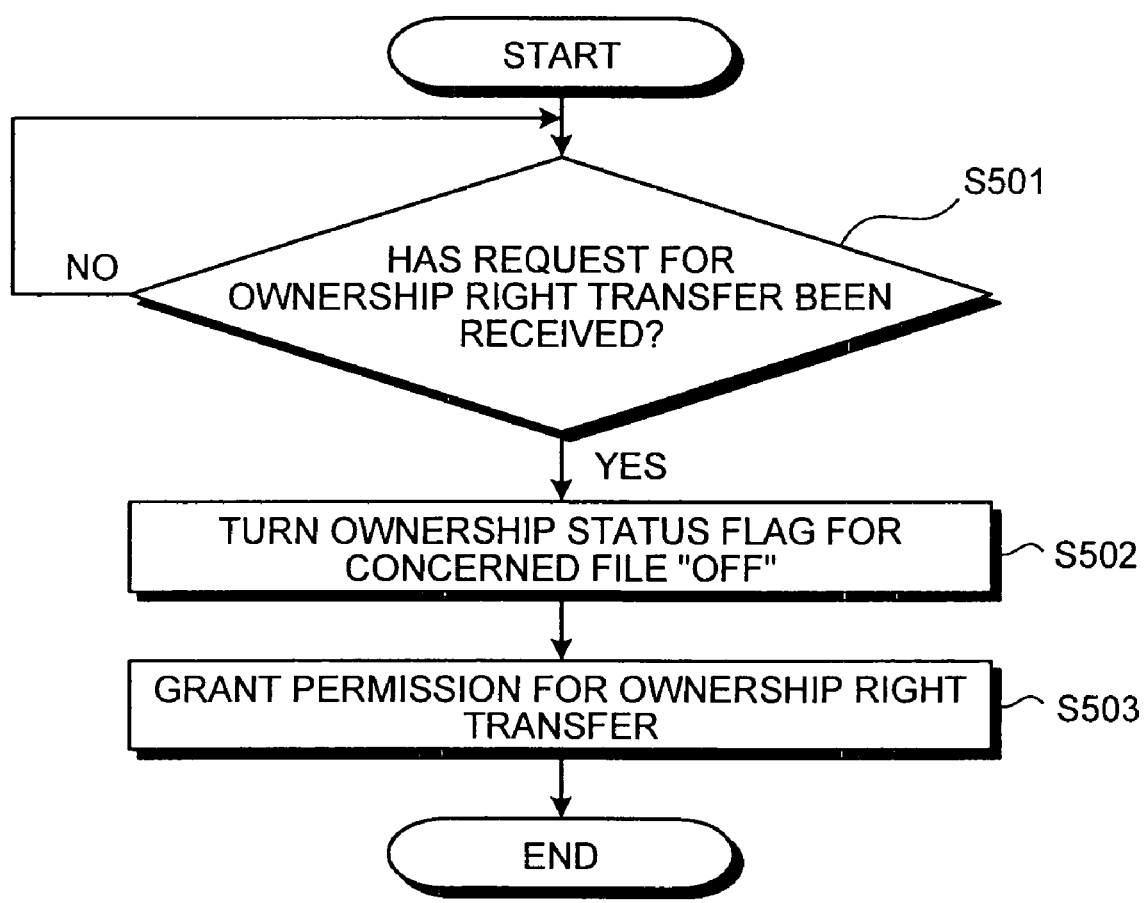

FIG.9

OWNERSHIP MANAGEMENT TABLE

| FILE NAME | OWNERSHIP STATUS FLAG | MIRRORING NECESSITY FLAG |
|---|---|---|
| A | — | — |
| B | O | O |
| C | O | — |
| ⋮ | ⋮ | ⋮ |

FIG.13

OWNERSHIP MANAGEMENT TABLE

| FILE NAME | OWNERSHIP STATUS FLAG | DATA STORAGE DEVICE ID | MIRRORING PROCESS FLAG |
|---|---|---|---|
| A | — | 2 | ○ |
|   |   | 3 | ○ |
|   |   | 4 | ○ |
|   |   | 5 | ○ |
|   |   | 6 | ○ |
|   |   | 7 | ○ |
|   |   | 8 | ○ |
|   |   | 9 | ○ |
| B | ○ | 2 | ○ |
|   |   | 3 | ○ |
|   |   | 4 | ○ |
|   |   | 5 | ○ |
|   |   | 6 | ○ |
|   |   | 7 | — |
|   |   | 8 | — |
|   |   | 9 | — |
| C | ○ | 2 | ○ |
|   |   | 3 | ○ |
|   |   | 4 | — |
|   |   | 5 | — |
|   |   | 6 | — |
|   |   | 7 | — |
|   |   | 8 | — |
|   |   | 9 | — |
| ⋮ | ⋮ | ⋮ | ⋮ |

FIG.16

OWNERSHIP MANAGEMENT TABLE

| FILE NAME | OWNERSHIP STATUS FLAG | REAL DATA TRANSFER FLAG |
|---|---|---|
| A | — | — |
| B | — | O |
| C | O | — |
| ⋮ | ⋮ | ⋮ |

MIRRORING METHOD, MIRRORING DEVICE, AND COMPUTER PRODUCT

BACKGROUND OF THE INVENTION

1. Field of the Invention

The present invention relates to a mirroring method, a mirroring device, and a computer product.

2. Description of the Related Art

Remote mirroring, which involves replicating data in a primary location at a physically remote site, is considered as a technology for providing security for the protection of critical data from disasters such as fire and earthquake.

For example, a technology is disclosed in Japanese Patent Application Laid-open No. 2003-167683 wherein, among data written at a local site, user data and a copy of journal log are transmitted to a remote site, excluding the metadata. As a result, as the metadata at the remote site is updated using the copy of the journal log and the data are updated at the local site, the update contents can be referred to in the latest file data at the remote site in real time.

In another technology disclosed in Japanese Patent Application Laid-open No. 2005-128861, a write-data sequence assigning unit that assigns the sequence of write data reception is provided as a redundant configuration to enable a destination data storage device to store the write data in the correct sequence even if the data reception time or data related to data sequence is not received for some reason.

Remote mirroring is realized by a primary data storage device that stores an original master file, and a secondary data storage device that stores a backup file. The primary data storage device and the secondary data storage device are connected by a communication channel such as a wide area network (WAN), and either device can be accessed, as they virtually function as a single storage device.

There are two types of remote mirroring, i.e., synchronous and asynchronous. In synchronous remote mirroring, the primary data storage device writes the received data to the master file in response to a write request from a data processing device and sends the data synchronously to the backup file maintained in the secondary data storage device via the communication channel, and notifying the data processing device of write completion. Specified data stored in the master file is sent to a data processing device in response to a read request from the data processing device.

On the other hand, in asynchronous remote mirroring, the primary data storage device writes the received data to the master file in response to a write request from the data processing device, but sends only file management data to the backup file in the secondary data storage device, and notifies the data processing device of write completion. The primary data storage device sends the real data to the secondary data storage device later. Specified data stored in the master file is sent to the data processing device in response to a read request from the data processing device.

The secondary data storage device receives confirmation from the primary data storage device that the file to which data is to be written in response to the write response from the data processing device is open, sends the data to the master file in the primary data storage device, synchronously receiving the replica file management data from the primary data storage device. The secondary data storage device then copies the replica file management data in its backup file and notifies the data storage device of write completion. When the real data is later received from the primary data storage device, the secondary data storage device writes it to the backup file. In asynchronous remote mirroring, if a read request is received from the data processing device before the real data is received from the primary data storage device, the secondary data storage device sends to the primary data storage device a request for the real data, writes the real data received from the primary data storage device to the backup file, and sends the specific data from the backup file.

However, each of the plurality of data storage devices deployed for realizing remote mirroring has different levels of performance when processing the request from the data processing device. In other words, every time the data processing device accesses the secondary data storage device for a write request, the secondary data storage device has to first confirm that the master file in the primary data storage device is open, making the write and read performance from the secondary data storage device a less efficient one. Thus, the data processing device experiences a disparity in the read/write speed between the primary data storage device and the secondary data storage device.

SUMMARY OF THE INVENTION

It is an object of the present invention to at least partially solve the problems in the conventional technology.

According to an aspect of the present invention, a data storage device that is connected to another data storage device and stores therein files to be mirrored in response to a request from a data processing device, includes a storage unit that stores therein ownership data, for each of the files, indicating whether the file is a mirror source or a mirror destination, an updating unit that updates the ownership data of the file according to transfer of an ownership right to the file, and a mirroring unit that controls, in response to a write request to the file from the data processing device, mirroring of the file based on whether the file is a mirror source or a mirror destination by referring to the ownership data.

A mirroring method for replicating data, in response to a request from a data processing device, between data storage devices that are communicably connected to each other and store therein files, the mirroring method includes retaining, for each of the files, ownership data indicating whether the file is a mirror source or a mirror destination, updating the ownership data of the file according to transfer of an ownership right to the file, receiving a write request to the file from the data processing device, and mirroring, in response to the write request, the file based on whether the file is a mirror source or a mirror destination by referring to the ownership data.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the contents of an ownership management table shown in FIG. 2;

FIG. 4 is a flowchart of an ownership status changing process;

FIG. 5 is another flowchart of the ownership status changing process;

FIG. 9 is an example of the contents of an ownership management table according to the second embodiment;

FIG. 13 is an example of the contents of a ownership management table according to the fifth embodiment;

FIG. 16 is an example of the contents of a ownership management table according to the seventh embodiment.

DETAILED DESCRIPTION OF THE PREFERRED EMBODIMENTS

Exemplary embodiments of the present invention are described in detail below with reference to the accompanying drawings.

Specific terms used in the following description are explained below. The term "ownership rights" refers to the privilege of storing a file as a mirror source. Only one data storage device among a plurality of data storage devices deployed for realizing remote mirroring can have the ownership rights ("to have file ownership rights" is another way of saying "to store files as a mirror source") The term "file management data" refers to information required for the data storage device to manage data as files. Coordination of the file management data between the data storage devices enables files to be provided in the same state irrespective of which of the data storage devices the data processing device accesses. The file management data includes metadata, directory information, etc. The term "data processing device" refers to a device that enables a user to execute specific tasks by using application software.

The term "real data" refers to data managed by the data storage device by using the file management data, and is generated by the data processing device.

Figure 1:
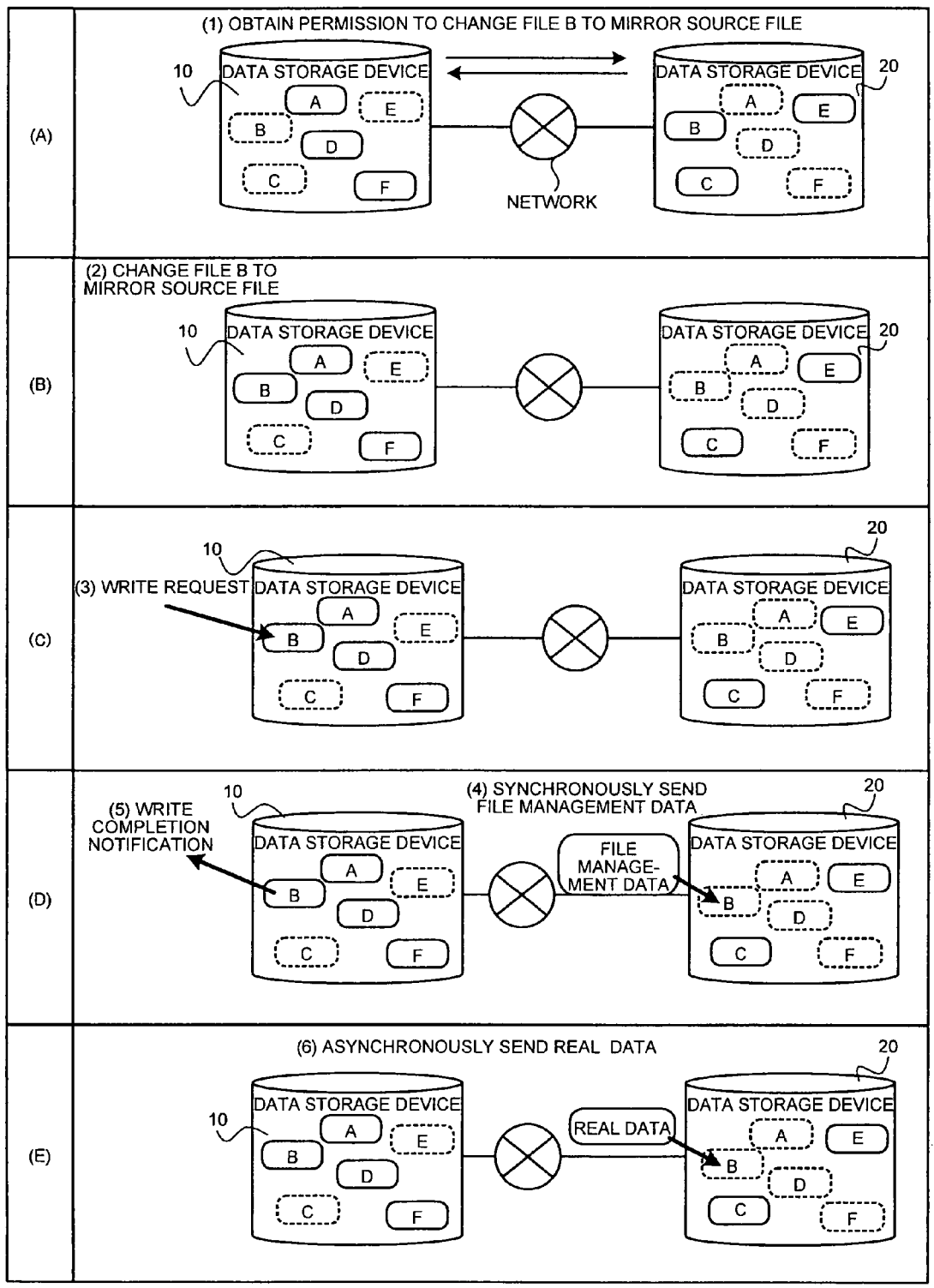
FIG. 1 is a schematic diagram for explaining an overview and salient feature of a data storage device according to a first embodiment of the present invention.

FIG. 1 is a schematic diagram for explaining the overview and salient feature of a data storage device 10 according to a first embodiment of the present invention.

The data storage device 10 is communicably connected to another data storage device via a network such as wide area network (WAN). When one of the data storage devices receives a write request from the data processing device, corresponding data is replicated (mirrored) in the other data storage device. The salient feature of the first embodiment is that the data storage devices can equally provide high performance to the data processing device irrespective of which of the data storage devices deployed for realizing remote mirroring the data processing device accesses.

The data storage device 10 stores therein a plurality of files, and holds ownership data for every file that indicates whether the data storage device 10 is a mirror source or a mirror destination for the file.

Specifically, as shown in (A) of FIG. 1, from among files A to E that the data storage device 10 stores, the data storage device 10 has ownership rights to the files A, D, and F, and treats the files A, D, and F as mirror source files. Contrasting with the data storage device 10, another data storage device 20 has ownership rights to the files B, C, and E, and treats the files B, C, and E as mirror source files.

As the situation demands, the data storage device 10 changes the ownership data for any file from mirror source to mirror destination and vice versa.

Specifically, as shown in (A) of FIG. 1, the data storage devices 10 and 20 are deployed for realizing remote mirroring. If the number of read requests and write requests for the file B owned by the data storage device 20 is large, the data storage device 10 requests the data storage device 20 to transfer the ownership rights to the file B to itself (see (1) in (A) of FIG. 1).

Upon receiving permission for ownership right transfer from the data storage device 20, the data storage device 10 changes the file B from a mirror destination file to a mirror source file (see (2) in (B) of FIG. 1).

If, at this point, a write request for the file is received from-the data processing device, the data storage device 10 refers to the ownership data for the file and controls a mirroring process in response to the write request according to whether the write-requested file is a mirror source file or a mirror destination file.

Specifically, as shown in (C) and (D) of FIG. 1, upon receiving a write request for the file B (see (3) in (C) of FIG. 1), the data storage device 10 writes data received from the data processing device to the file B as the ownership data of the file B indicates that it is a mirror source file, and synchronously sends the file management data to the data storage device 20 (see (4) in (D) of FIG. 1). The data storage device 10 then notifies the data processing device of write completion (see (5) in (D) of FIG. 1).

As shown in (E) of FIG. 1, later, when it is time to send the real data, the data storage device 10 sends the real data of the file B asynchronously to the data storage device 20 (see (6) in (E) of FIG. 1). If the file B is accessed by data processing device frequently, the data storage device 10 responds faster than previously. Thereafter, the data storage device 20 changes the ownership status of the file B from mirror destination to mirror source according to how frequently the file is accessed.

Figure 2:
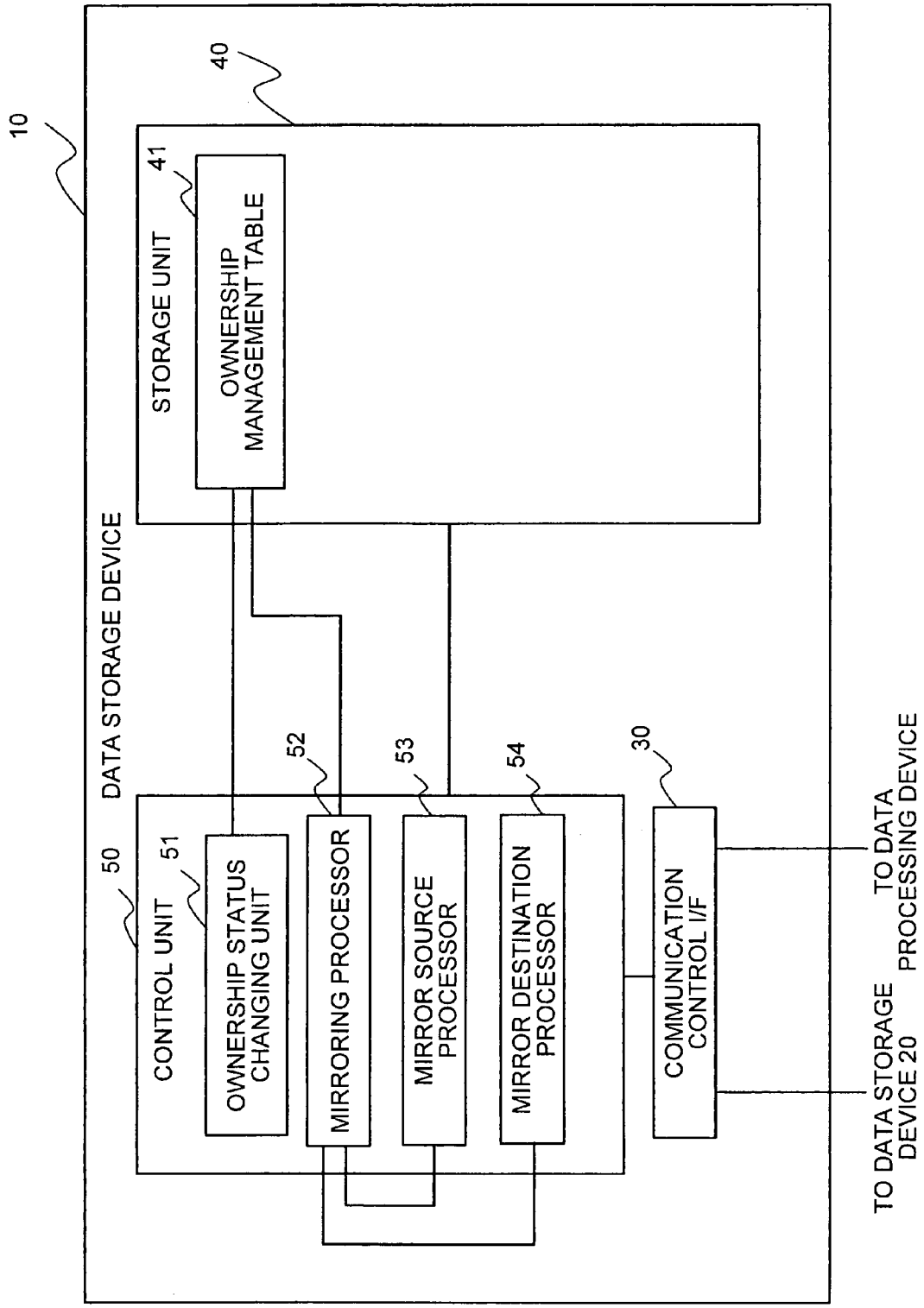
FIG. 2 is a block diagram of the data storage device according to the first embodiment.

FIG. 2 is a block diagram of the data storage device 10. The data storage device 10 includes a communication control interface (I/F) 30, a storage unit 40, and a control unit 50. The communication control I/F 30 controls the communication between the control unit 50 and the data storage device 20 as well as other data storage devices.

The storage unit 40 stores therein data and programs required for various processes performed by the control unit 50. Besides, the storage unit 40 stores therein an ownership management table 41. The storage unit 40 also stores therein the files generated by the data processing device as mirror source or mirror destination.

The ownership management table 41 stores therein the ownership data for every file indicating whether the file is a mirror source file or a mirror destination file. FIG. 3 is an example of the contents of the ownership management table 41. The ownership management table 41 contains items such as File name and Ownership status flag in an associated form. In FIG. 3, the file name "A" is associated with the ownership status flag "Off" ("Off" indicates a mirror destination file, and "On" indicates a mirror source file).

The control unit 50 performs various processes and includes an internal memory storing therein control programs such as Operating System (OS), various programs and data required for performing those processes. The control unit 50 includes an ownership status changing unit 51, a mirroring processor 52, a mirror source processor 53, and a mirror destination processor 54.

The ownership status changing unit 51 changes, for every file, the ownership status flag stored in the ownership management table 41 from mirror source to mirror destination and vice versa. Specifically, when it is time to change the ownership status flag of a file owned by the data storage device 20 in response to frequent read request and write request for the file from the data processing device, the ownership status changing unit 51 obtains permission from the data storage device 20 for ownership right transfer for the file via the communication control I/F 30, and changes the ownership status flag of the file from mirror source to mirror destination or vice versa. For example, when the number of times a mirror destination file is accessed exceeds a predetermined threshold value in a set time period, the ownership status changing unit 51 obtains permission for ownership right transfer from the data storage device 20, and changes the ownership status flag associated with the file name from "Off" to "On".

When a write request for the file, the mirroring processor 52 refers to the ownership status flag stored in the ownership management table 41, and controls the mirroring process in response to the write request according to whether the write-requested file is a mirror source file or a mirror destination file.

Specifically, upon receiving a write request from the data processing device for the file via the communication control I/F 30, the mirroring processor 52 refers to the ownership status flag stored in the ownership management table 41, and controls the mirror source processor 53 or the mirror destination processor 54 described later to perform a perform mirroring process according to whether the write-requested file is a mirror source file or a mirror destination file.

For example, upon receiving a write request for the file name "A" from the data processing device via the communication control I/F 30, the mirroring processor 52 controls the mirror destination processor 54 to perform the mirroring process as the ownership flag status stored corresponding to the file name "A" in the ownership management table 41 is "Off".

The mirror source processor 53 processes writing to the mirror source file. Specifically, upon receiving a control signal from the mirroring processor 52, the mirror source processor 53 receives the write data from the data processing device via the communication control I/F 30 and writes the data to the file. Once the data is written to the file, the mirror source processor 53 synchronously sends the file management data related to data writing to the data storage device 20. Upon receiving confirmation from the data storage device 20 that the file management data has been written, the mirror source processor 53 notifies the data processing device of write completion. When it is time to send the real data, the mirror source processor 53 sends the real data asynchronously to the data storage device 20.

The mirror destination processor 54 processes writing to the mirror destination file. Specifically, upon receiving the control signal from the mirroring processor 52, the mirror destination processor 54 accesses the data storage device 20 via the communication control I/F 30 to confirm that the concerned file is open. Once it is confirmed that the file is open, the mirror destination processor 54 sends the data received from the data processing device to the data storage device 20 via the communication control I/F 30. Upon receiving the file management data related to data writing sent synchronously by the data storage device 20, the mirror destination processor 54 writes the file management data to the file and notifies the data processing device of write completion. The mirror destination processor 54 later receives the real data sent by the data storage device 20 via the communication control I/F 30, and writes the real data to the file.

Figure 6:
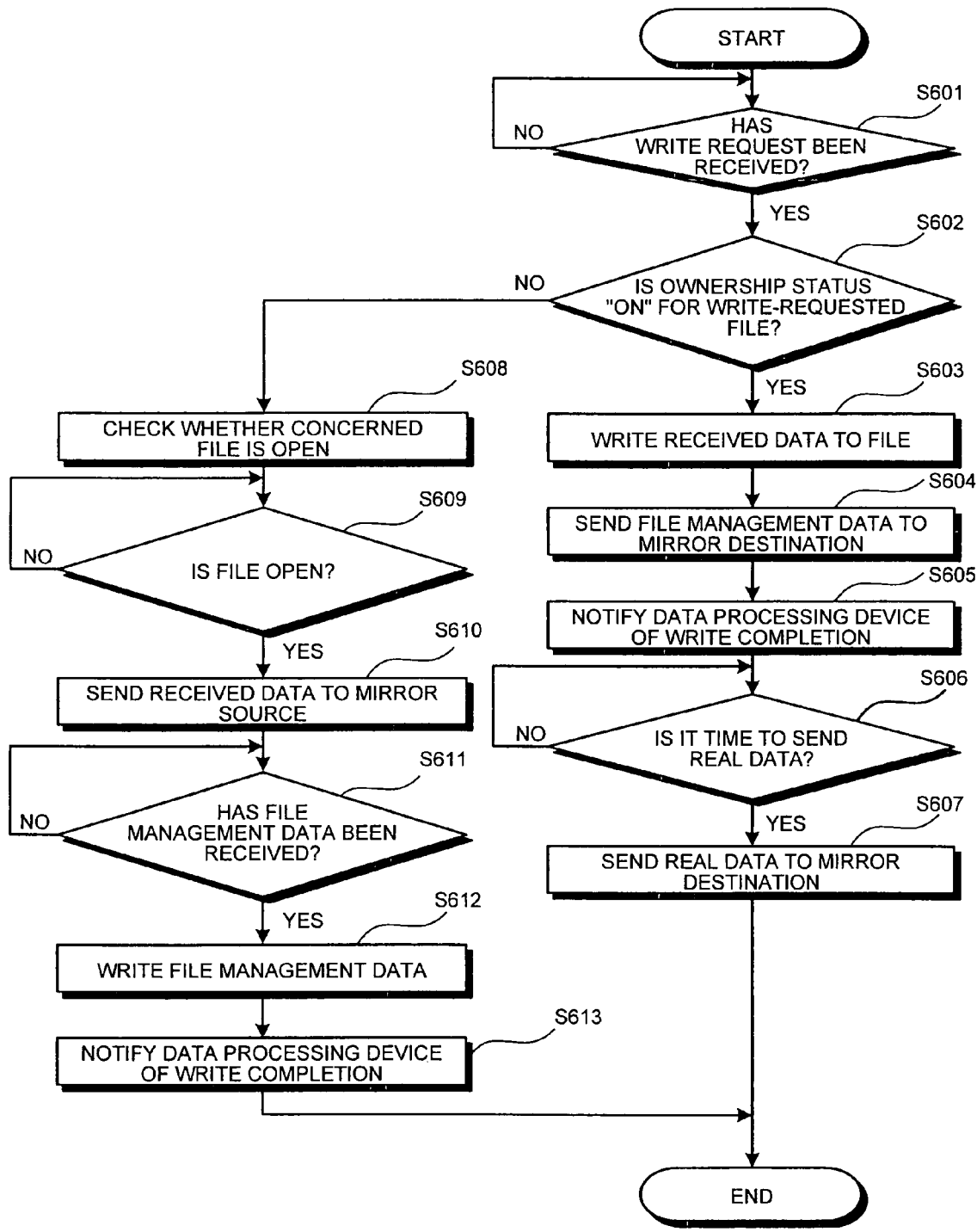
FIG. 6 is a flowchart of a process in response to a request from a data processing device.
Figure 7:
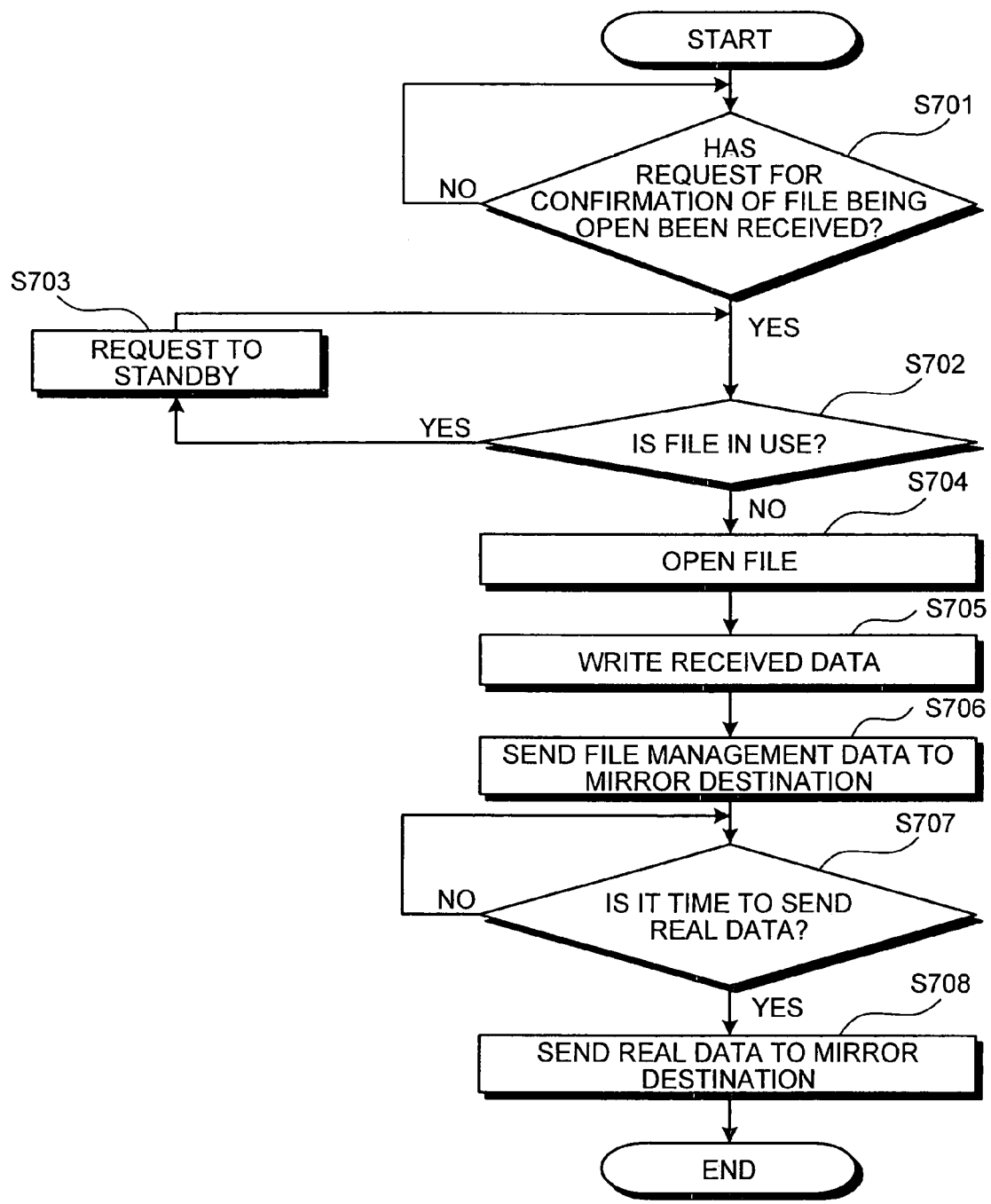
FIG. 7 is a flowchart of a data transfer process performed by the data storage device.

The processes performed by the data storage device according to the first embodiment are described below with reference to FIGS. 4 to 7. FIG. 4 and 5 are flowcharts of an ownership status changing process. FIG. 6 is a flowchart of a process in response to a write request from the data processing device. FIG. 7 is a flowchart of a data transfer process performed by the data storage device.

In the ownership status changing process, as shown in FIG. 4, when it is time to change the ownership status in response to frequent accesses of the file (Yes at step S401), the ownership status changing unit 51 requests the data storage device 20 for ownership right transfer (step S402). Upon receiving permission for ownership right transfer from the data storage device 20 (step S403), the ownership status changing unit 51 turns the ownership status flag for the file from "Off" to "On" (step S404), and the process ends.

As shown in FIG. 5, upon receiving a request for ownership right transfer from the data storage device 20 (Yes at step S501), the ownership status changing unit 51 turns the ownership status flag for the file from "On" to "Off" (step S502), and grants permission for ownership right transfer to the data storage device 20 (step S503). Thus, the process ends.

In the process in response to a write request from the data processing device, as shown in FIG. 6, upon receiving a write request from the data processing device via the communication control I/F 30 (Yes at step S601), the mirroring processor 52 refers to the ownership status flag stored in the ownership management table 41 (step S602).

If the write request is for a file whose ownership status is "On" (Yes at step S602), the mirroring processor 52 outputs the control signal to the mirror source processor 53, which writes the data received from the data processing device to the concerned file (step S603). The mirror source processor 53 synchronously sends the file management data related to data writing to the data storage device 20 (step S604). Upon receiving confirmation from the data storage device 20 that the file management data has been written, the mirror source processor 53 notifies the data processing device of write completion (step S605).

When it is time to send the real data to the data storage device 20 (Yes at step S606), the mirror source processor 53 sends the real data to the data storage device 20 (step S607).

If the write request is for a file whose ownership status is "Off" (No at step S602), the mirroring processor 52 outputs the control signal to the mirror destination processor 54. Upon receiving the control signal, the mirror destination processor 54 accesses the data storage device 20 to check whether the concerned file is open (step S608). If the file is open (Yes at step S609), the mirror destination processor 54 sends the data received from the data processing device to the data storage device 20 (step S610).

Having received the file management data forwarded from the data storage device 20 (Yes at step S611), the mirror destination processor 54 writes the file management data (step S612) and notifies the data processing device of write completion (step S613), ending the process.

In the process of data transfer to the data storage device 20, as shown in FIG. 7, upon receiving a request from the data storage device 20 for confirmation that the file is open (Yes at step S701), the mirror source processor 53 requests the data storage device 20 to stand by (step S703) if the file is being accessed by the data processing device for reading or writing (Yes at step S702), or opens the file in response to the request from the data storage device 20 (step S704) if the file is not being accessed by the data processing device for reading or writing (No at step S703). Having received the data from the data storage device 20, the mirror source processor 53 writes the data (step S705). The mirror source processor 53 sends the file management data to the data storage device 20 (step S706). When it is time to send the real data to the data storage device 20 (Yes at step S707), the mirror destination processor 54 sends the real data to the data storage device 20 (step S708), ending the process.

Thus, according to the first embodiment, the data storage device stores, for every file, an ownership status flag that indicates whether the file is a mirror source or a mirror destination, and dynamically changes the ownership status flag from "On" to "Off" and vice versa as required. If a write request to a file is received from the data processing device, the data storage device controls the mirroring process in response to the write request based on whether the concerned file is a mirror source file or a mirror destination file. Consequently, the data processing device is able to experience equally fast read/write performance, irrespective of which of the plurality of data storage devices deployed for realizing remote mirroring the data processing device accesses. In other words, by dynamically changing the mirror source/mirror destination relation between the data storage devices, the disparity in the read/write speed among the plurality of data storage devices is eliminated. Thus, the data processing device is provided with equally fast read/write performance from any of the data storage devices.

According to the first embodiment, the ownership status flag for a file is switched between "On" and "Off" according to how frequently the file is accessed by the data processing device. Consequently, equally fast read/write performance can be obtained irrespective of which of the plurality of data storage devices deployed for realizing remote mirroring the data processing device accesses. In other words, depending on how frequently a file is accessed by the data processing device, the mirror source-mirror destination relationship between the data storage devices changes dynamically. Consequently, equally fast read/write performance can be obtained irrespective of which of the plurality of data storage devices deployed for realizing remote mirroring the data processing device accesses.

According to the first embodiment, when mirroring a write-requested file in the mirror destination, the file management data is sent to the mirror destination data storage device synchronous with writing the real data to the mirror source data storage device, and the real data is sent later to the mirror destination data storage device asynchronously after the real data is written to the mirror source data storage device. Consequently, equally fast read/write performance can be obtained irrespective of which of the plurality of data storage devices deployed for realizing remote mirroring the data processing device accesses. In other words, even if there is a delay in communication between the data storage devices impacting most the transfer of the real data, by sending the real data asynchronously, equally fast read/write performance can be obtained irrespective of which of the plurality of data storage devices deployed for realizing remote mirroring the data processing device accesses.

In the first embodiment, all the files stored in the plurality of data processing devices are mirrored. In a second embodiment of the present invention, only some of the files stored in the data storage devices are mirrored.

Figure 8:
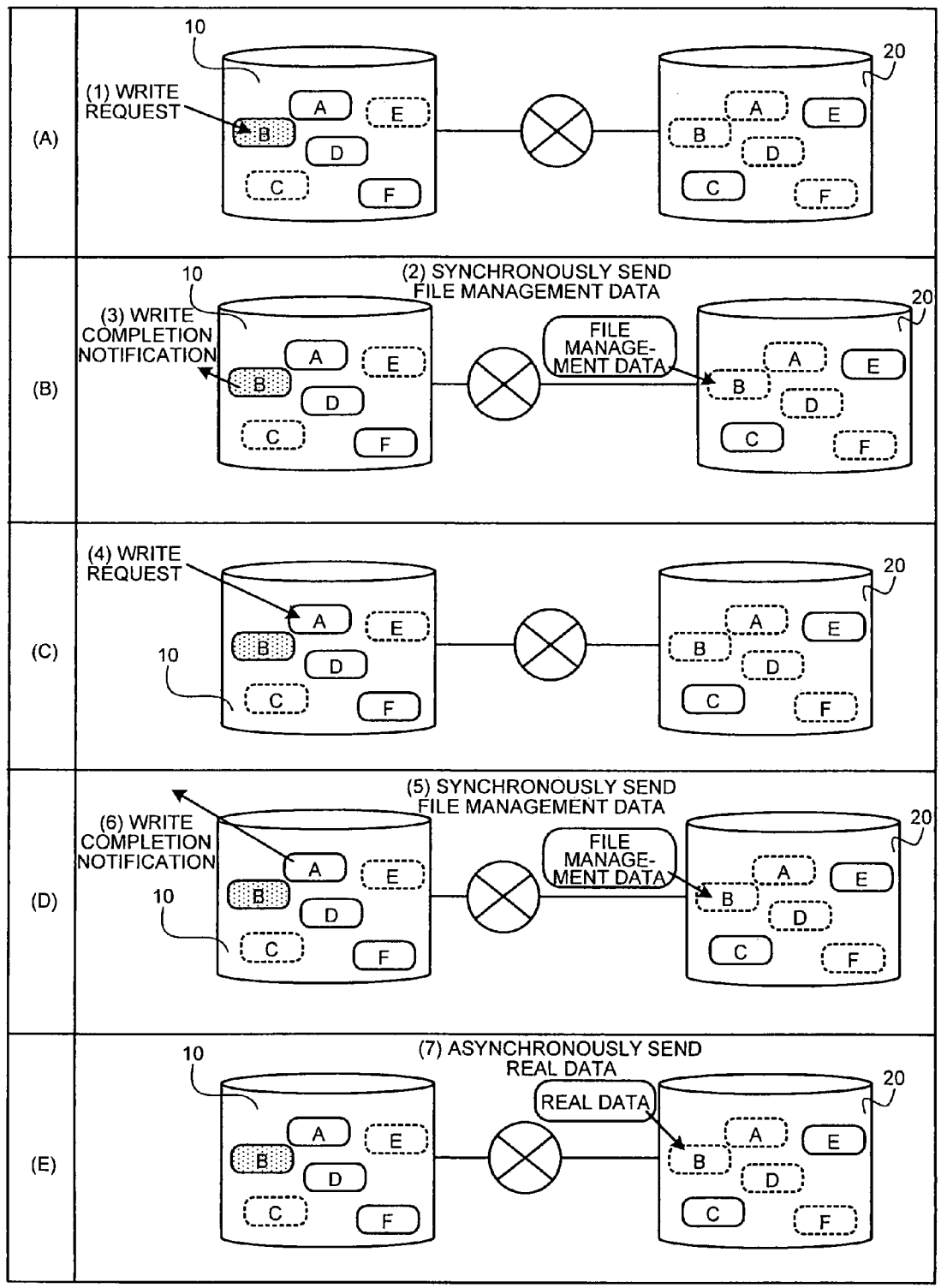
FIG. 8 is a schematic diagram for explaining the data storage device according to a second embodiment of the present invention.

FIG. 8 is a schematic diagram for explaining the data storage device according to the second embodiment.

As shown in (A) of FIG. 8, from among the files A to E that the data storage device 10 stores, the data storage device 10 has ownership rights to the files A, B, D, and F, and treats the files A, B, D, and F as mirror source files. Of these files, the data storage device 10 sets the file B as a file for which it sends only the file management data and not the real data to the data storage device 20. Contrasting with the data storage device 10, the data storage device 20 has ownership rights to the files C and E, and treats the files C, and E as mirror source files.

Specifically, the data storage device 10 realizes such file management status as described above by further storing a mirror status data associated with each file in the ownership management table 41. FIG. 9 is an example of the contents of an ownership management table according to the second embodiment. As shown in FIG. 9, the ownership management table of the second embodiment contains, in addition to File name and Ownership status flag, an item Mirroring necessity flag, in an associated form. For example, in the ownership management table, the File name "B", the Ownership status flag "On", and the Mirroring necessity flag "On" are associated with one another.

Upon receiving a write request for the file B from the data processing device (see (1) in (A) of FIG. 8), the data storage device 10 writes the data received from the data processing device to the file B as the file B is a mirror source file according to the ownership data.

As it is set in the ownership management table for the file B that only the file management data and not the real data will be sent to the data storage device 20, the data storage device 10 sends to the data storage device 20 only the file management data synchronous with writing the data to the file B in the data storage device 10 (see (2) in (B) of FIG. 8). Thereafter, the data storage device 10 notifies the data processing device of write completion (see (3) in (B) of FIG. 8), and ends the process in response to the write request. That is, the data storage device 10 does not ever send the real data to the data storage device 20.

Specifically, when mirroring a write-requested file in the mirror destination, the mirror source processor 53 of the data storage device 10 realizes the process in response to the write request by referring to the mirror status data, and either sending only the file management data or the file management data followed later by the real data to the mirror destination data storage device. To explain with reference to the flowchart shown in FIG. 6, after the data received from the data processing device is written to the file at step S603, the mirror source processor 53 refers to the ownership management table as shown in FIG. 9, and according to the Mirroring necessity flag, either sends only the file management data or the file management followed later by the real data to the mirror destination data storage device.

Upon receiving a write request from the data processing device for the file A (see (4) in (C) of FIG. 8), the data storage device 10 writes the data received from the data processing device to the file A as the file A is a mirror source file according to the ownership data.

Synchronous with writing the data to the file A, the data storage device 10 sends the file management data to the data storage device 20 (see (5) in (D) of FIG. 8), and notifies the data processing device of write completion (see (6) in (D) of FIG. 8).

Thereafter, when it is time to send the real data to the data storage device 20, the data storage device 10 sends the real data of the file A to the data storage device 20 (see (7) in (E) of FIG. 8).

Thus, according to the second embodiment, for every file the data storage unit additionally stores therein the Mirroring necessity flag that indicates whether only the file management data is to be sent or the file management data as well as the real data is to the mirror destination. During the mirroring process, the data storage unit refers to the Mirroring necessity flag and accordingly either sends only the file management data or the file management data as well as the real data to the mirror destination data storage device. Consequently, equally fast read/write performance can be obtained irrespective of which of the plurality of data storage devices deployed for realizing remote mirroring the data processing device accesses. In other words, as a result of doing away with mirroring those files that do not require to be replicated, equally fast read/write performance can be obtained irrespective of which of the plurality of data storage devices deployed for realizing remote mirroring the data processing device accesses.

In the first and second embodiments, mirroring is realized between two data storage devices. Three or more data storage devices can be deployed for realizing mirroring.

Figure 10:
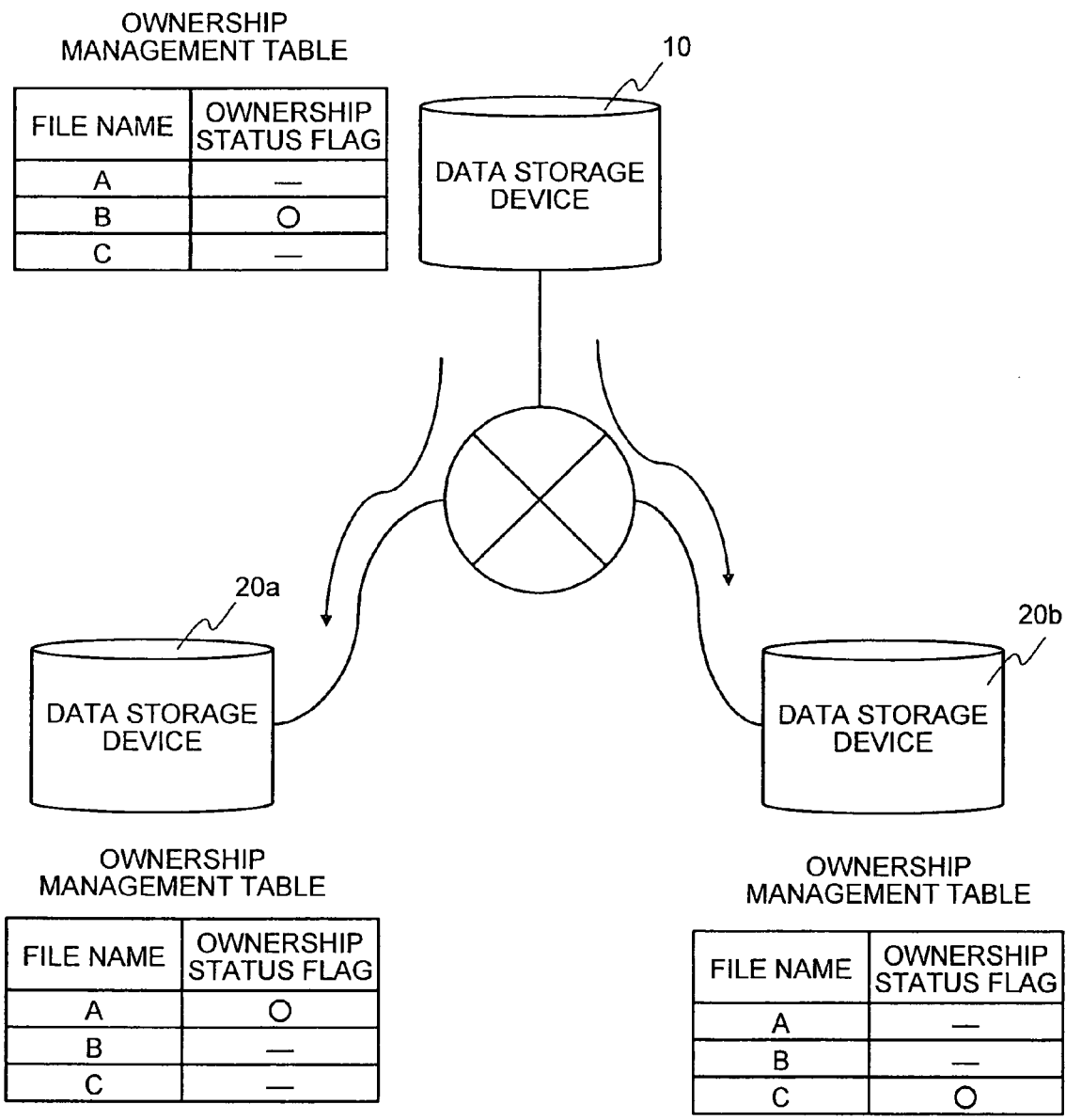
FIG. 10 is a schematic diagram for explaining the data storage device according to a third embodiment of the present invention.

FIG. 10 is a schematic diagram of the data storage device according to a third embodiment of the present invention. As shown in FIG. 10, the data storage device 10 is communicably connected to data storage devices 20a and 20b via a network such as the WAN.

Upon receiving a write request from the data processing device for the file B, the data storage device 10 refers to the ownership status flag stored in the ownership management table 41, and writes the data received from the data processing device to the file B as the ownership status flag is "On". Thereafter, the data storage device 10 sends the file management data to the data storage devices 20a and 20b synchronously, and when it is time to send the real data, sends the real data to the data storage devices 20a and 20b.

Thus, according to the third embodiment, as compared to a structure obtained by a plurality of data storage devices having a parent-child relationship amongst themselves, the mirroring process can be realized by a simple structure obtained by merely connecting a plurality of data storage devices to one another.

In the third embodiment, mirroring is realized synchronously among a plurality of data storage devices. In a fourth embodiment of the present invention, mirroring is realized by establishing a parent-child relationship between a plurality of data storage devices.

Figure 11:
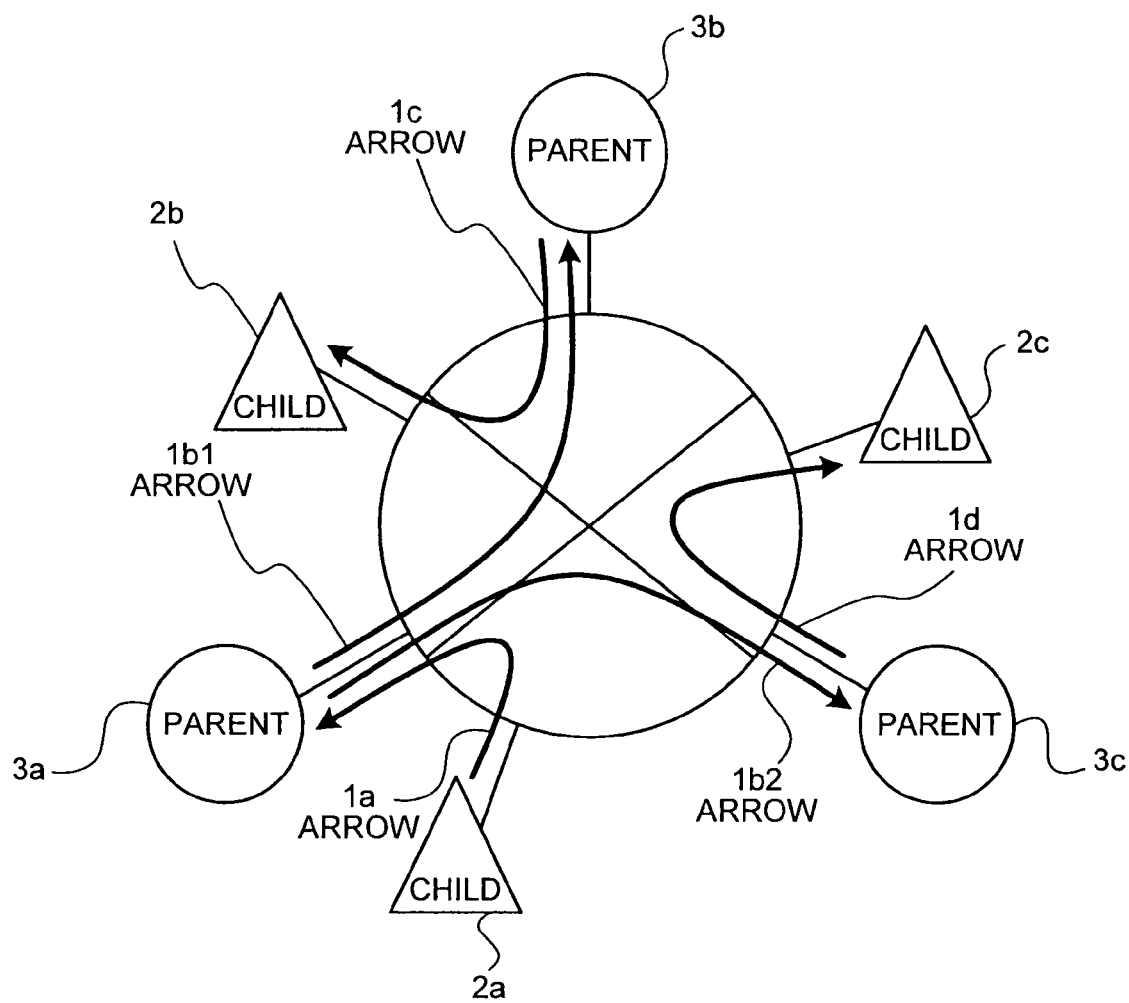
FIG. 11 is a schematic diagram for explaining the data storage device according to a fourth embodiment of the present invention.

FIG. 11 is a schematic diagram for explaining the data storage device according to the fourth embodiment. As shown in FIG. 11, the data storage device 10 functioning as a child data storage device 2a is communicably connected to a data storage device functioning as a parent data storage device 3a via a network such as the WAN.

Upon receiving a write request for a mirror source file from the data processing device, the child data storage device 2a writes the data received from the data processing device to the concerned file. The child data storage device 2a then synchronously sends the file management data only to the parent data storage device 3a (see arrow 1a).

The parent data storage device 3a sends the file management data received from the child data storage device 2a to other parent data storage devices 3b and 3c (see arrows 1b1 and 1b2). The parent data storage device 3b sends the file management data to a child data storage device 2b (see arrow 1c) and the parent data storage device 3c sends the file management data to a child data storage device 2c (see arrow 1d1).

Later, when it is time to send the real data, the child data storage device 2a sends the real data only to the parent data storage device 3a. The real data can also be passed from the parent data storage device 3a to the plurality of data storage devices along the routes described for the file management data.

If the write request from the data processing device is received by the parent data storage device 3a, the parent data storage device 3a writes the data received from the data processing device to the concerned file. The parent data storage device 3a then synchronously sends the file management data to the child data storage device 2a and the parent data storage devices 3b and 3c.

The parent data storage device 3b sends the file management data to the child data storage device 2b and the parent data storage device 3c sends the file management data to the child data storage device 2c.

Later, when it is time to send the real data, the parent data storage device 3a sends the real data to the plurality of data storage devices along the routes described for the file management data.

Thus, according to the fourth embodiment, mirroring is performed only between devices that are either related as parent-child or between parent devices. Consequently, as compared to a structure obtained by a plurality of data storage devices that are merely connected to one another without establishment of a parent-child relationship amongst themselves, the burden of the mirroring process can be lightened by establishing a parent-child relation between the data storage devices deployed in mirroring.

In the third embodiment, all the files stored in the plurality of data storage devices are mirrored. However, in a fifth embodiment of the present invention, only some of the files stored in the data storage devices are mirrored.

Figure 12:
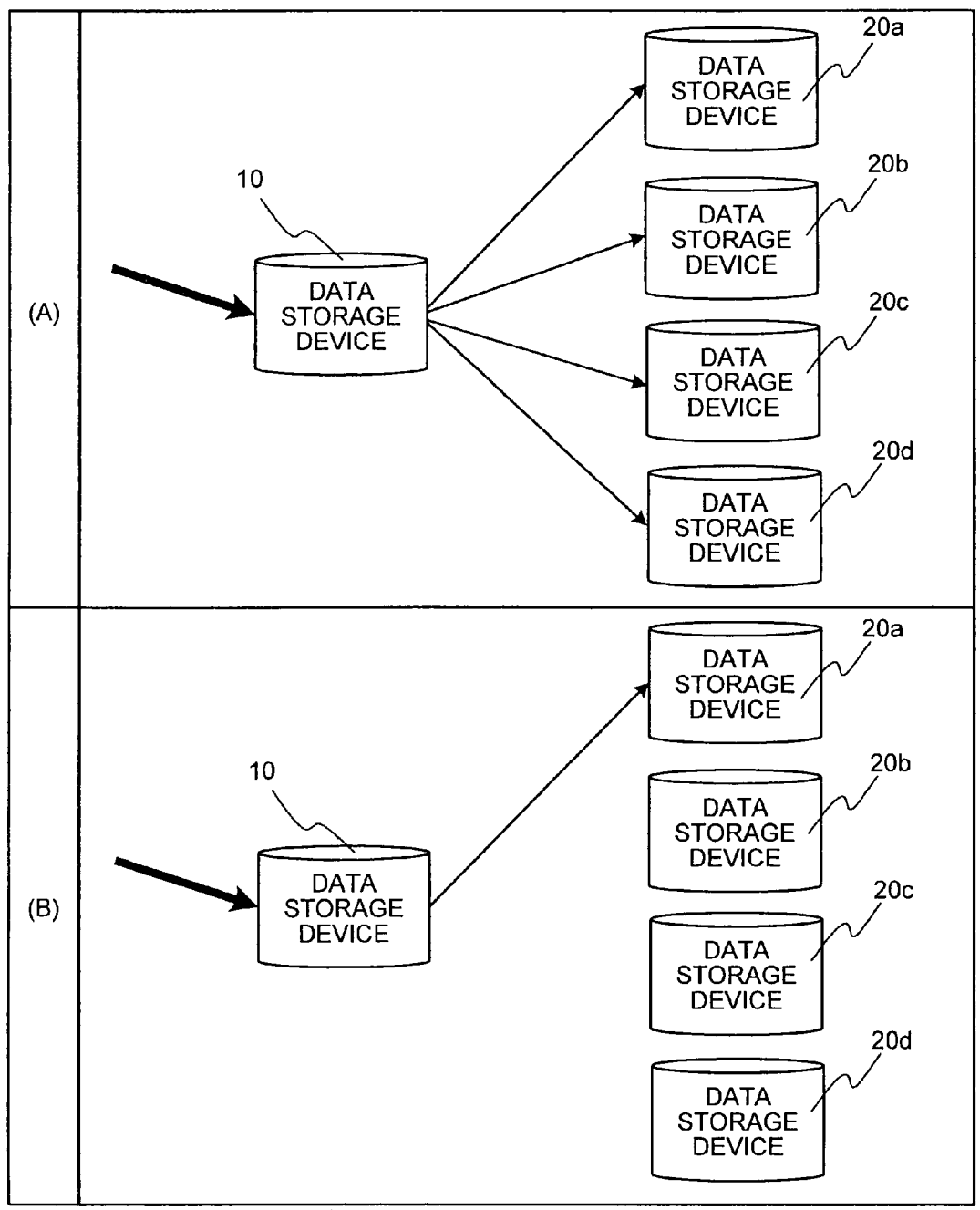
FIG. 12 is a schematic diagram for explaining the data storage device-according to a fifth embodiment of the present invention.

FIG. 12 is a schematic diagram for explaining the data storage device according to the fifth embodiment. As shown in (A) of FIG. 12, when a file is to be replicated, the data storage device 10 sends the real data in addition to the file management data to all data storage devices 20a to 20d, which are communicably connected to the data storage device 10 via a network such as the WAN.

Alternatively, as shown in (B) of FIG. 12, when a file is to be replicated, the data storage device 10 sends the real data in addition to the file management data only to the data storage device 20a, and sends only the file management data to the data storage devices 20b to 20d.

Specifically, an ownership management table according to the fifth embodiment realizes the selective mirroring described above by further storing redundancy data for each file associated with the file name. FIG. 13 is an example of the contents of the ownership management table according to the fifth embodiment. As shown in FIG. 13, in the ownership management table of the fifth embodiment, the file name "A" for which redundancy is required is associated with the Ownership status flag "Off", and a Mirroring process flag "On" for the eight Data storage device IDs. The File name "C" for which redundancy is not required is associated with the Ownership status flag "On" and the Mirroring process flag "On" only for two of the eight Data storage device IDs.

When mirroring the write-requested file to the mirror destination, the mirror source processor 53 of the data storage device 10 refers to the redundancy data, and mirrors the file only in those specified mirror destination data storage devices. To explain with reference to the flowchart shown in FIG. 6, after the data received from the data processing device is written to the file at step S603, the mirror source processor 53 refers to the ownership management table, and determines whether only the file management data is to be sent or both the file management data and the real data are to be sent to a particular data storage device based on the mirroring process flag.

Thus, according to the fifth embodiment, for every file, the data storage unit additionally stores therein the redundancy data. During the mirroring process, the data storage unit refers to the redundancy data and accordingly mirrors the file only in the specified mirror destination data storage devices. Consequently, equally fast read/write performance can be obtained irrespective of which of the plurality of data storage devices deployed for realizing remote mirroring the data processing device accesses. In other words, as a result of doing away with mirroring those files that do not require to be replicated, equally fast read/write performance can be obtained irrespective of which of the plurality of data storage devices deployed for realizing remote mirroring the data processing device accesses. Further, by replicating the files that require to be mirrored in several data storing devices, preservation of files in the event of a disaster can be ensured.

In a sixth embodiment of the present invention, the data storage device assesses whether the real data is required based on how often a file is accessed and availability of space, and deletes unnecessary real data stored as mirror.

Figure 14:
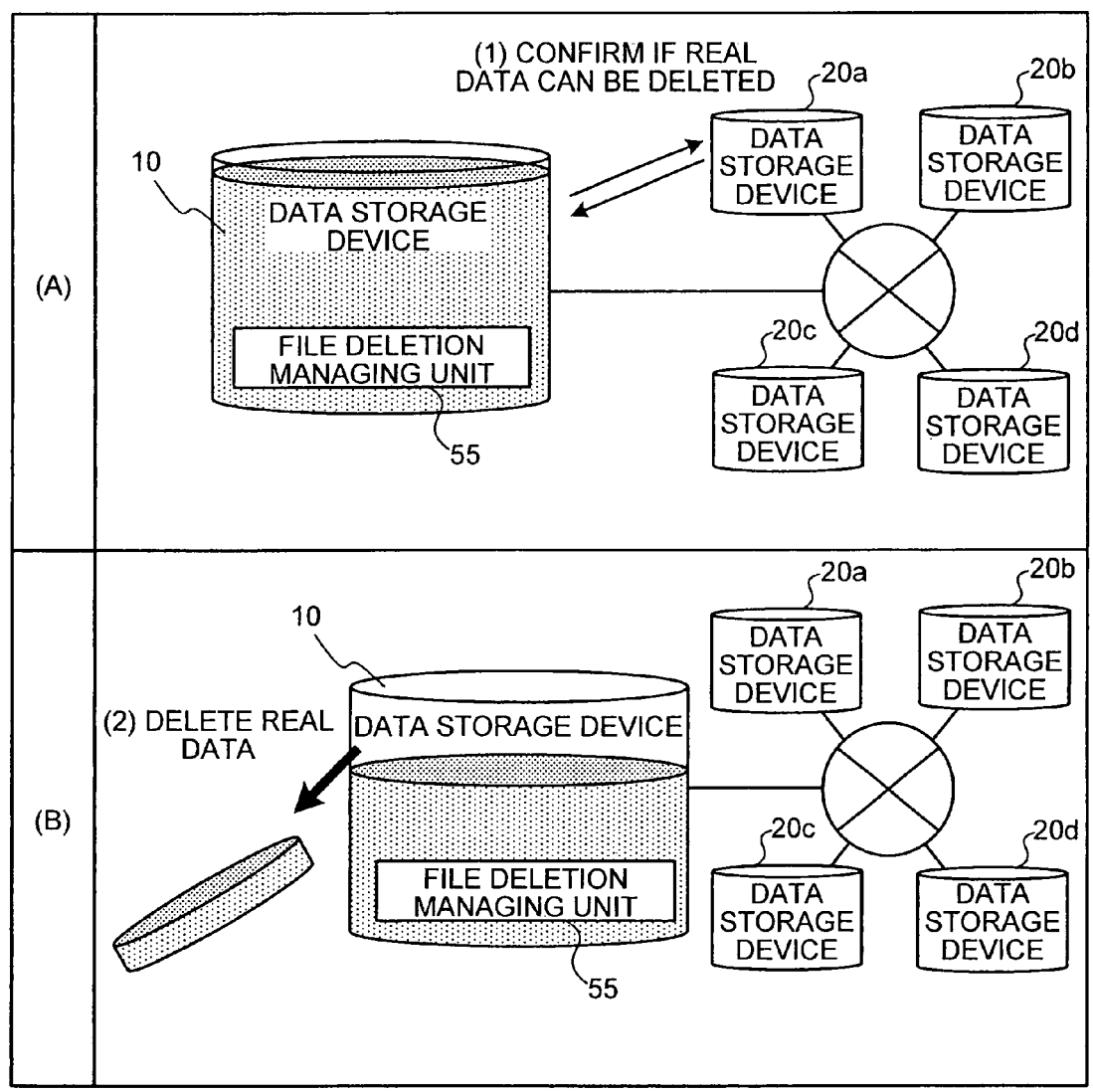
FIG. 14 is a schematic diagram for explaining the data storage device according to a sixth embodiment of the present invention.

FIG. 14 is a schematic diagram for explaining the data storage device according to the sixth embodiment. As shown in (A) of FIG. 14, the data storage device 10 is communicably connected to the data storage devices 20a to 20d via a network such as the WAN. When the available space in the storage unit 40 drops, the data storage device 10 requests permission from the data storage device 20a for deleting the real data of the mirror files that are no longer required using a file deletion managing unit 55 (see (1) in (A) of FIG. 14). Incidentally, the data storage device 20a stores the concerned files as mirror source files.

As shown in (B) of FIG. 14, upon receiving permission from the data storage device 20a, the file deletion managing unit 55 of the data storage device 10 deletes the real data of the concerned files (see (2) in (B) of FIG. 14).

Thus, according to the sixth embodiment, the data storage device assesses whether the files stored by it as mirror destination files are required according to the availability of space in the data storage device 10 and deletes the real data of those files that are no longer required. Consequently, files that need to be mirrored can be more reliably mirrored. In other words, by deleting unnecessary data and creating more space for storing files that need to be mirrored, the probability of reliably storing files that are likely to be looked up can be increased.

In a seventh embodiment of the present invention, if a network breakdown occurs before the real data is transferred to a mirror destination file and meanwhile the data processing device accesses the mirror destination file for reading or writing, the data storage device ignores the real data that remains to be sent and responds by changing the ownership rights to the file.

Figure 15:
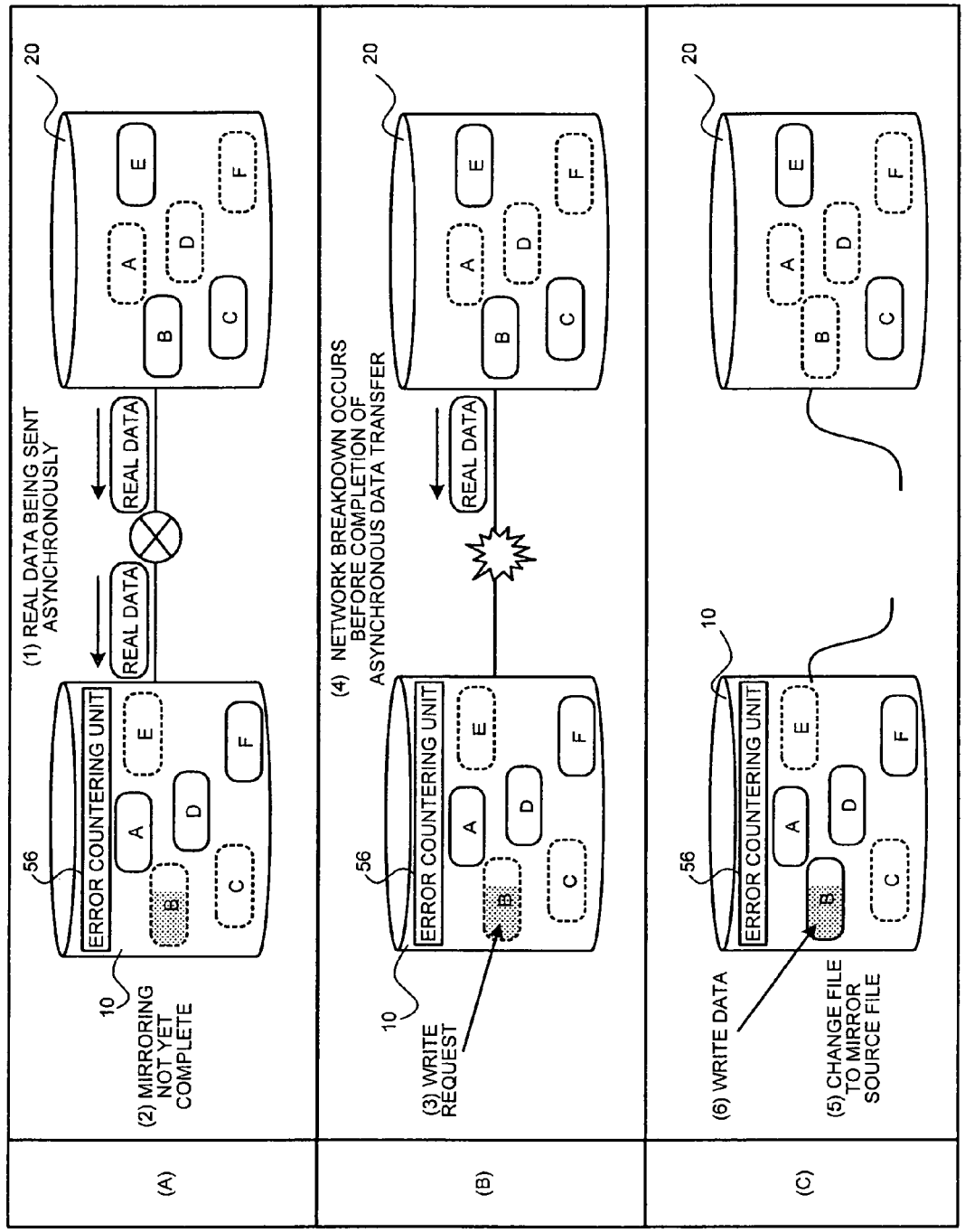
FIG. 15 is a schematic diagram for explaining the data storage device according to a seventh embodiment of the present invention.

FIG. 15 is a schematic diagram for explaining the data storage device according to the seventh embodiment. As shown in (A) of FIG. 15, upon receiving the real data asynchronously to be written to the mirror destination file B from the data storage device 20 (see (1) in (A) of FIG. 15), the data storage device 10 writes the real data to the file B. As shown in FIG. 16, an ownership management table of the data storage device 10 according to the seventh embodiment contains, in addition to File name and Ownership status flag, an item Real data transfer flag that indicates whether the transmission of the real data has been completed, in an associated form.

As shown in FIG. 15, if a network breakdown (see (4) in (B) of FIG. 15) occurs when the data storage device 10 is writing the real data being transmitted from the data storage device 20 to the file B (see (2) in (B) of FIG. 15) and meanwhile there is a write request for the file B from the data processing device (see (3) in (B) of FIG. 15), an error countering unit 56 refers to the Real data transfer flag, which in this case is "On", and changes the file B from mirror destination file to mirror source file (see (5) in (C) of FIG. 15), ignores the real data that remains to be sent, receives the write request from the data processing device, and writes the data received from the data processing device to the file B (see (6) of FIG. 15).

Thus, according to the seventh embodiment, if a network breakdown occurs before the mirroring process is completed and meanwhile the data processing device accesses the mirror destination file in the data storage device for reading or writing, the data storage device changes the Ownership status flag of the concerned file from "Off" to "On", that is, changes the file from a mirror destination file to a mirror source file, and responds as a mirror source to the read/write request from the data processing device. Consequently, the user can continue to access the file via the data processing device without having to wait for the network connection to be restored.

The present invention allows various modifications. Examples of the modifications are given below.

In the first embodiment, the ownership status is changed according to how frequently a file is accessed. However, it is possible to configure the data storage device so that the ownership status can be changed dynamically. For example, the ownership status can be changed dynamically whenever there is a read/write request for a mirror destination file. Alternatively, the ownership status can be changed manually by the user.

In the first embodiment, the file management data is transmitted synchronously and the real data asynchronously. However, both the file management data and the real data can be sent either synchronously or asynchronously. The metadata and the directory data included in the file management data again can be sent one synchronously and the other asynchronously, or both in the same manner.

In the sixth embodiment, the data storage device deletes real data when the available space in the storage unit drops. However, the data storage device can be configured to delete the real data of the files based on the demand for the file. For example, the data storage device can be configured to delete files starting from the file for which read/write requests from the data processing device are least.

In the seventh embodiment, when there is a network breakdown before the transfer of real data of a file is completed and meanwhile there is a write request for the file whose real data is being transferred, the data storage device is configured to ignore unsent data and respond to the write request from the data processing device. However, the data storage device can be configured to reject any write request until the network is restored, and restart transfer of real data once the network is restored.

The constituent elements of the device shown in the drawings are merely conceptual, and need not be physically configured as illustrated. The constituent elements, as a whole or in part, can be separated or integrated either functionally or physically based on various types of loads or use conditions. For example, the mirroring processor 52, the mirror source processor 53, and the mirror destination processor 54 can be integrated. The process functions performed by each unit can be entirely or partially realized by a central processing unit (CPU) or a computer program executed by the CPU, or realized as hardware by wired logic.

The process procedures, the control procedures, specific names, and data including various parameters mentioned in the description and drawings can be changed as required unless otherwise specified. For example, the file names need not necessarily be represented by alphabets and can be anything that clearly distinguishes one file from another.

Figure 17:
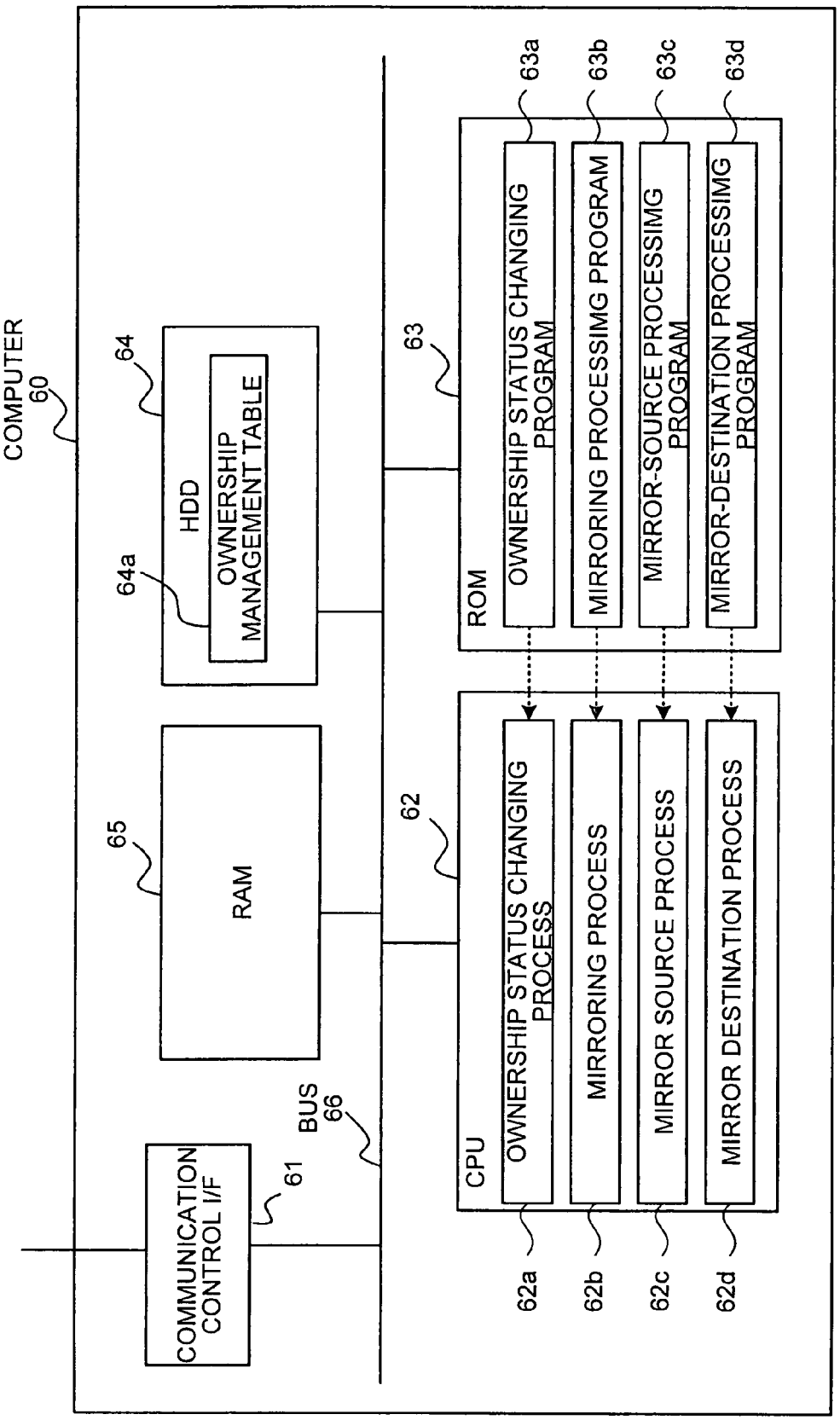
FIG. 17 is a functional block diagram of a computer that executes a mirroring program.

The data storage device according to the first embodiment is explained as hardware. However, it can be implemented as software. In other words, a computer program (hereinafter, "mirroring program") can be executed on a personal computer or a workstation to realize the same functions as the data storage device 10. FIG. 17 is a functional block diagram of a computer 60 that executes the mirroring program.

The computer 60 that functions as the data storage device 10 includes a communication control interface (I/F) 61, a CPU 62, a read-only memory (ROM) 63, a hard disk drive (HDD) 64, a random access memory (RAM) 65, and a bus 66 that connects all the parts mentioned above.

The ROM 63 stores therein the mirroring program that implements the functions of the data storage device 10. In other words, as shown in FIG. 17, the ROM 63 stores therein, as the mirroring program, an ownership status changing program 63a, a mirroring processing program 63b, a mirror-source processing program 63c, and a mirror-destination processing program 63d. Similar to the data storage device 10 shown in FIG. 2, whose constituent elements can be integrated as required, the computer programs 63a to 63d can be integrated as required.

The CPU 62 reads the computer programs 63a to 63d from the ROM 63 and executes them to implement an ownership status changing process 62a, a mirroring process 62b, a mirror source process 62c, and a mirror destination process 62d, which correspond to the ownership status changing unit 51, the mirroring processor 52, the mirror source processor 53, and the mirror destination processor 54 shown in FIG. 2, respectively.

The HDD 64 stores therein an ownership management table 64a, which corresponds to the ownership management table 41 shown in FIG. 2.

The computer programs 63a to 63d can be stored in a portable physical medium that can be inserted into the computer 60, such as a flexible disk, a compact disk-read-only memory (CD-ROM), a magneto optic (MO) disk, a digital versatile disk (DVD), an integrated circuit (IC) card, etc. Alternatively, they can be stored in a fixed physical medium that can be connected externally to the computer 60, such as an HDD or on another computer (or server) connected to the computer 60 over a public line, the Internet, a local area network (LAN), a wide area network (WAN), etc. The computer 60 can read the computer programs from these mediums and execute the various processes.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for data mirroring of a file, in response to a request from a data processing device, between data storage devices that are communicably connected to each other and include a first data storage device and a second data storage device, the computer program causing the computer to execute:
   retaining, for the file, ownership data indicating that the file is stored as a mirror source or a mirror destination, the file stored as the mirror destination being a replica of the file stored as the mirror source;
   changing the ownership data of the file from the mirror source to the mirror destination, or from the mirror destination to the mirror source;
   receiving a request to write data to the file in the first storage device from the data processing device;
   referring to the ownership data of the file; and
   mirroring including storing, when the ownership data indicates that the request is to write data to the file stored as the mirror destination, the file in the second data storage device storing the file as the mirror source, and then replicating the file in the first data storage device.

2. The computer-readable recording medium according to claim 1, wherein the changing includes changing the ownership data based on at least one of write request frequency and read request frequency from the data processing device, process status in another data storage device, and instruction from a user.

3. The computer-readable recording medium according to claim 1, wherein
   the data storage devices include a first data storage device that stores therein the file as a mirror source, and a second data storage device that stores therein the file as a mirror destination,
   the mirroring includes
      the first data storage device writing the data to the file synchronously with sending file management data to the second data storage device; and
      the first data storage device sending the data to the second data storage device asynchronously after completion of writing the data to the file.

4. The computer-readable recording medium according to claim 1, wherein
   the data storage devices include a first data storage device that stores therein the file as a mirror source, and a second data storage device that stores therein the file as a mirror destination,
   the retaining includes retaining mirror status data associated with each of the files and the ownership data, the mirror status data indicating whether only file management data is required or both the file management data and the data are required, and
   the mirroring includes the first data storage device sending only the file management data or both the file management data and the data to the second data storage device based on the mirror status data.

5. The computer-readable recording medium according to claim 1, wherein
   the data storage devices are connected with each other without establishing a parent-child relationship, and
   data mirroring is performed between any pair of the data storage devices.

6. The computer-readable recording medium according to claim 1, wherein
   the data storage devices are in a parent-child relationship, and data mirroring is performed only between data storage devices in a parent-child relationship or between parent data storage devices.

7. The computer-readable recording medium according to claim 1, wherein
the data storage devices include a first data storage device that stores therein the file as a mirror source, and a plurality of second data storage devices that store therein the file as a mirror destination,
the retaining includes retaining redundancy data associated with each of the files and the ownership data, the redundancy data specifyinq at least one of the second data storage devices, and
the mirroring includes the first data storage device mirroring the file only for second data storage devices specified by the redundancy data.

8. The computer-readable recording medium according to claim 1, the computer program further causing the computer to execute:
determining whether a file stored as a mirror destination is necessary based on at least one of write request frequency and read request frequency from the data processing device and availability of space to store files, and
deleting real data of the file when the file is judged as unnecessary.

9. The computer-readable recording medium according to claim 1, wherein
the data storage devices include a first data storage device that stores therein the file as a mirror source, and a second data storage device that stores therein the file as a mirror destination,
the receiving includes the second data storage device receiving any one of a read request and a write request to the file from the data processing device before completion of mirroring of the file,
the changing includes, when the mirroring is interrupted due to a failure that has occurred in the first data storage device, the second data storage device changing the ownership data of the file from mirror destination to mirror source, and
the mirroring includes the second data storage device responding to any one of the read request and the write request based on the ownership data after the changing.

10. The computer-readable recording medium according to claim 1, wherein
the data storage devices include a first data storage device that stores therein the file as a mirror source, and a second data storage device that stores therein the file as a mirror destination,
the receiving includes the second data storage device receiving any one of a read request and a write request to the file from the data processing device before completion of mirroring of the file,
the mirroring includes, when the mirroring is interrupted due to a failure that has occurred in the first data storage device, the second data storage device responding to any one of the read request and the write request after the first data storage device recovers from the failure.

11. A data storage device that is connected to another data storage device and stores therein a file to be mirrored in response to a request from a data processing device, the data storage device comprising:
a storage unit that stores therein ownership data, for the file, indicating that the file is stored as a mirror source or a mirror destination, the file stored as the mirror destination being a replica of the file stored as the mirror source;
a changing unit that changes the ownership data of the file from the mirror source to the mirror destination, or from the mirror destination to the mirror source; and
a mirroring unit that controls, in response to a write request to the file from the data processing device when the ownership data indicates that the write request is to write data to the file stored as the mirror destination, storing of the file in the another data storage device storing the file as the mirror source, and then replicating the file in the data storage device.

12. A mirroring method for replicating a file, in response to a request from a data processing device, between data storage devices that are communicably connected to each other and include a first data storage device and a second data storage device, the mirroring method comprising:
retaining, for the file, ownership data indicating that the file is stored as a mirror source or a mirror destination, the file stored as the mirror destination being a replica of the file stored as the mirror source;
changing the ownership data of the file from the mirror source to the mirror destination, or from the mirror destination to the mirror source;
receiving a write request to the file in the first data storage device from the data processing device;
mirroring including storing, when the ownership data indicates that the request is to write data to the file stored as the mirror destination, the file in the second data storage device storing the file as the mirror source, and then replicating the file in the first data storage device.

* * * * *

UNITED STATES PATENT AND TRADEMARK OFFICE
CERTIFICATE OF CORRECTION

PATENT NO. : 7,778,975 B2
APPLICATION NO. : 11/902939
DATED : August 17, 2010
INVENTOR(S) : Naoshi Tsuchiya It is certified that error appears in the above-identified patent and that said Letters Patent is hereby corrected as shown below:

Column 15, Line 12 in Claim 7, delete "specifyinq" and insert --specifying--, therefor.

Signed and Sealed this
Fourth Day of January, 2011

David J. Kappos
*Director of the United States Patent and Trademark Office*